United States Patent
Waldron et al.

(10) Patent No.: US 7,657,049 B2
(45) Date of Patent: *Feb. 2, 2010

(54) TELEPHONE HANDSET

(75) Inventors: Joan Phillips Waldron, Fort Collins, CO (US); Brett William Jelkin, Windsor, CO (US); Joan Billger Burleigh, Ft. Collins, CO (US)

(73) Assignee: Able Planet, Incorporated, Wheat Ridge, CO (US)

( * ) Notice: Subject to any disclaimer, the term of this patent is extended or adjusted under 35 U.S.C. 154(b) by 333 days.

This patent is subject to a terminal disclaimer.

(21) Appl. No.: 10/864,692

(22) Filed: Jun. 9, 2004

(65) Prior Publication Data

US 2005/0117713 A1 Jun. 2, 2005

Related U.S. Application Data

(60) Provisional application No. 60/478,142, filed on Jun. 11, 2003, provisional application No. 60/478,152, filed on Jun. 11, 2003, provisional application No. 60/478,151, filed on Jun. 11, 2003.

(51) Int. Cl.
*H04R 25/00* (2006.01)

(52) U.S. Cl. ............................. 381/331; 379/443

(58) Field of Classification Search ............... 381/312, 381/315, 322, 326, 331; 379/443, 444
See application file for complete search history.

(56) References Cited

U.S. PATENT DOCUMENTS

| 4,160,122 | A | 7/1979 | Jacobson |
| 4,419,544 | A | 12/1983 | Adelman |
| 6,169,813 | B1 | 1/2001 | Richardson |
| 6,785,394 | B1 * | 8/2004 | Olsen et al. .................. 381/312 |
| 2001/0055386 | A1 * | 12/2001 | Waldron et al. ............. 379/444 |

OTHER PUBLICATIONS

METGLAS Solutions MICROLITE. Metglas website [online], Jun. 2002 and Aug. 2002 [retrieved on Mar. 1, 2007]. Retreived from the Internet:<URL: http://web.archive.org/web/20020616104539/www.metglas.com/products/page5_1_6_3.htm>, <URL: http://web.archive.org/web/20020622090558/www.metglas.com/products/page5_1_6_3_1.htm>and <URL: http://web.archive.org/web/20020803151934/www.metglas.com/products/page5_1_2_4.htm>.*

* cited by examiner

*Primary Examiner*—Walter F Briney, III
(74) *Attorney, Agent, or Firm*—Glenn H. Lenzen

(57) ABSTRACT

An improved telephone handset for hearing-impaired persons. A passive device, in the form of an inductor wound about a highly magnetostrictive core, is connected with the speaker in the handset. The device has been found to improve intelligibility of speech delivered by the handset, when perceived by persons afflicted with certain types of hearing impairment.

4 Claims, 6 Drawing Sheets

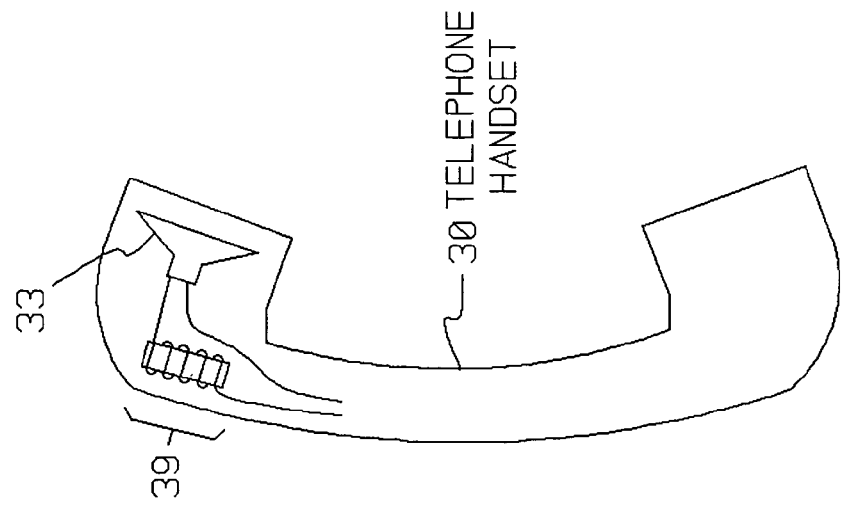
FIG 2
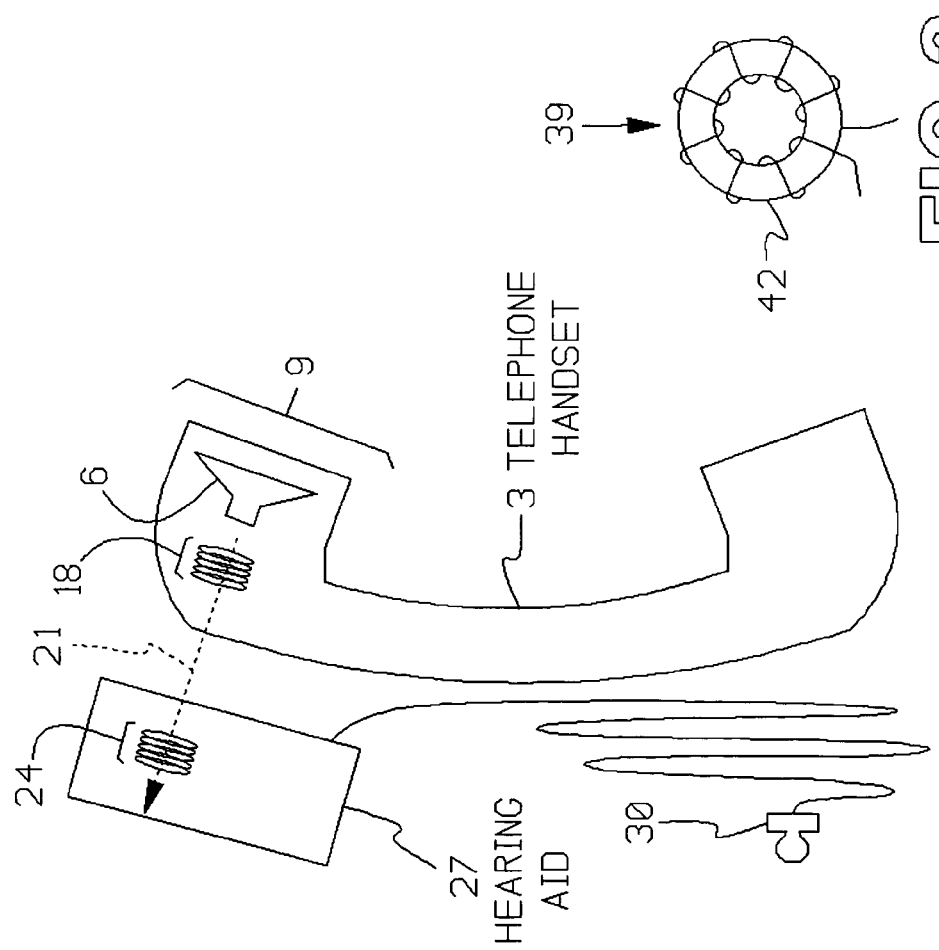
FIG 3
FIG 1
PRIOR ART

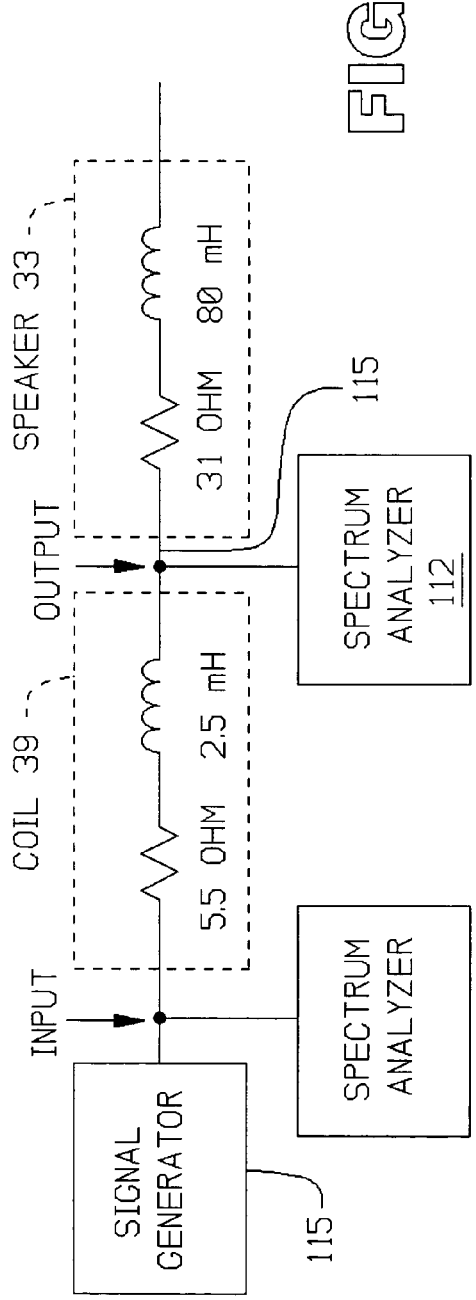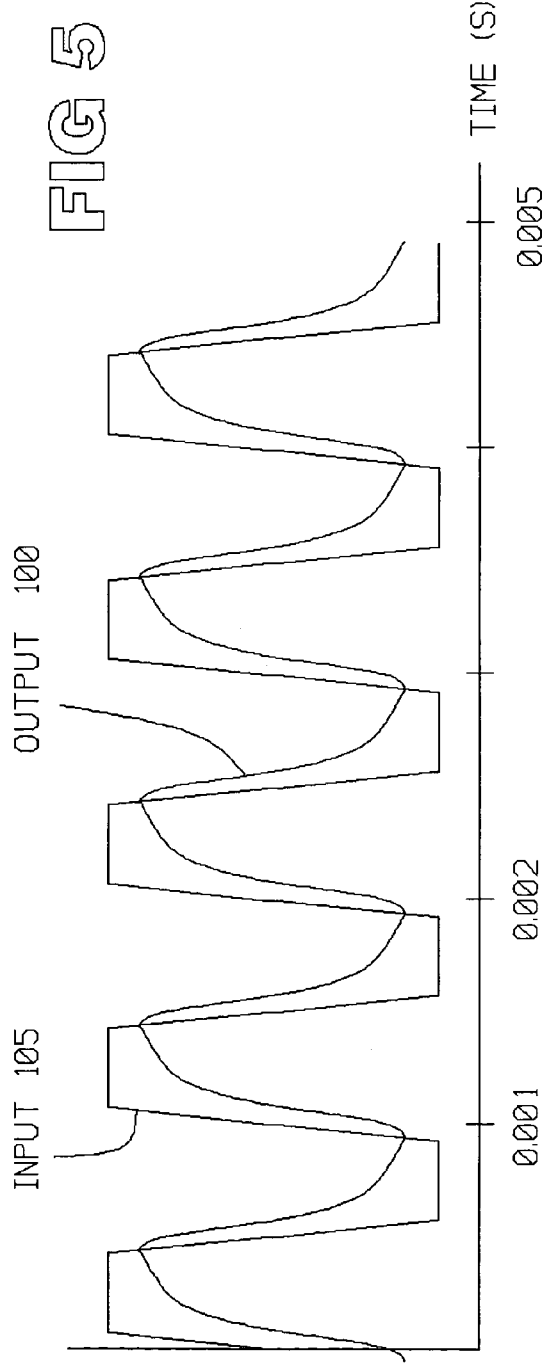

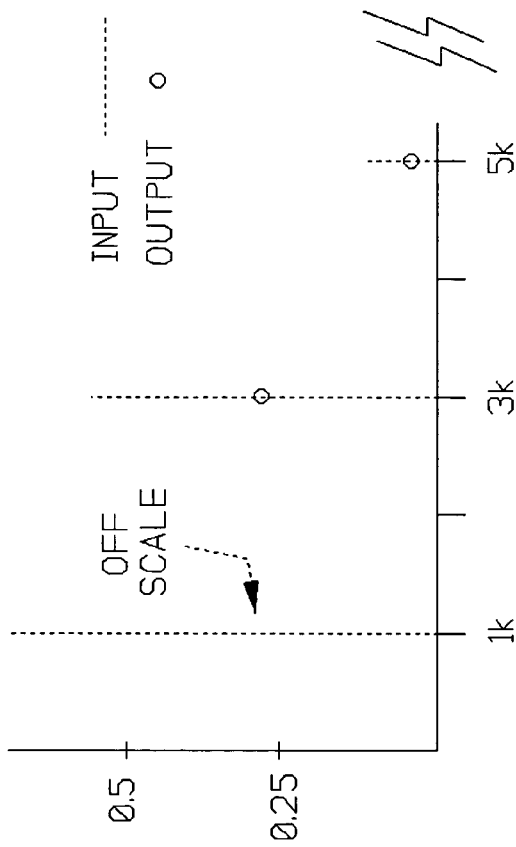

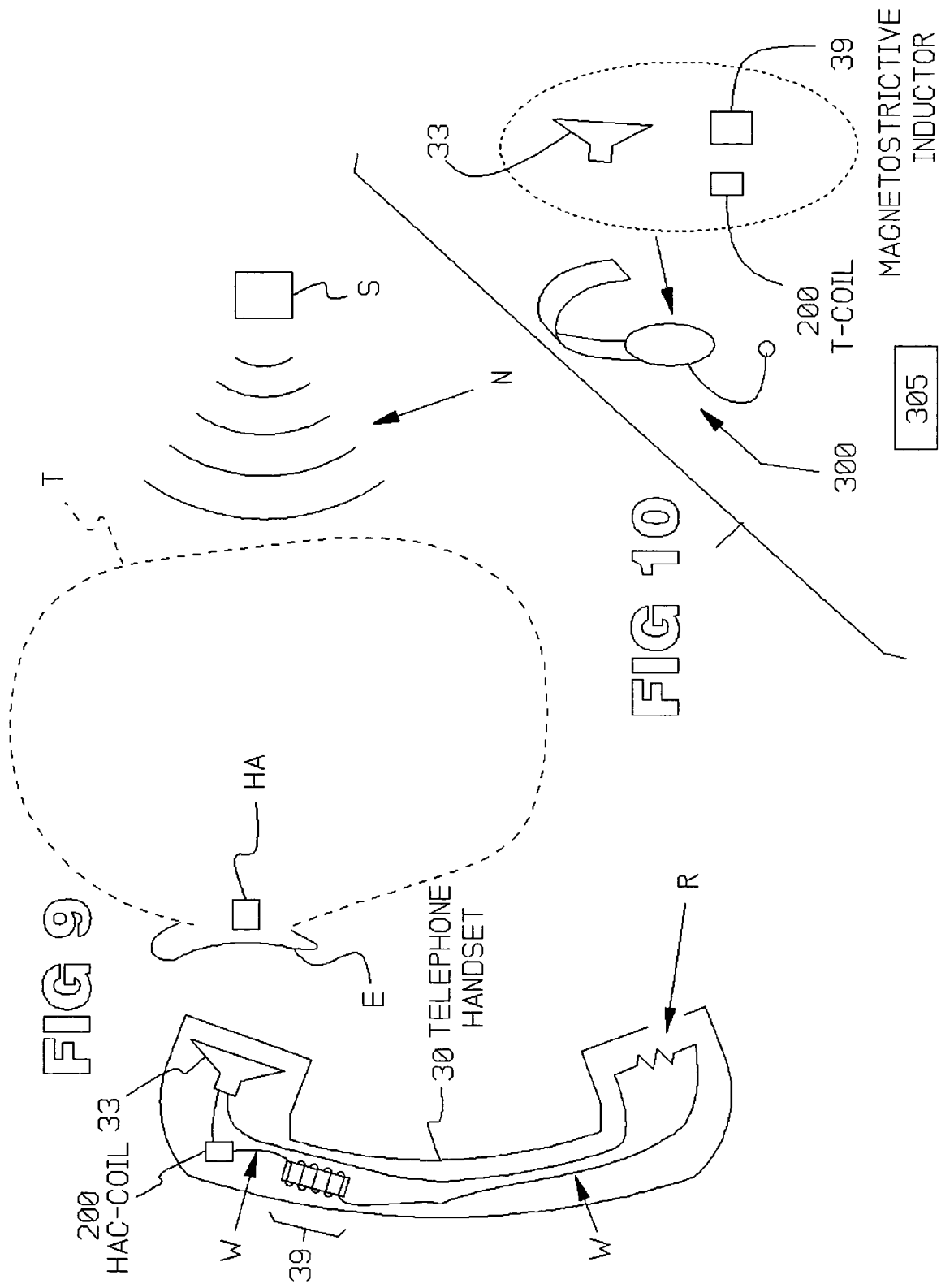

TELEPHONE HANDSET

CLAIM OF PRIORITY AND RELATED APPLICATION

This is a continuation of the following provisional applications, and the benefit of the filing dates of those provisionals is claimed under 35 USC §119.

Ser. No. 60/478,142, "Content Reduction Hearing System," filed Jun. 11, 2003;
Ser. No. 60/478,152, "Electrically Elegant Enhanced Speech Hearing System," filed Jun. 11, 2003; and
Ser. No. 60/478,151, "A Sound Communication System for Improved Hearing," filed Jun. 11, 2003.

The following application, serial number 10/864,691, entitled "Improved Telephone Handset," in which the Inventors are Joan Phillips Waldron and Brett William Jelkin, is filed concurrently herewith.

TECHNICAL FIELD

The invention concerns telephone handsets which implement signal-processing techniques for the benefit of hearing-impaired persons.

BACKGROUND OF THE INVENTION

Many telephone handsets are equipped with a device termed an HAC coil, or Hearing Aid Compatible coil. The HAC coil acts as an antenna, and broadcasts the audio signal received by the handset to a nearby hearing aid, which contains a similar coil, called a T-coil, which acts as a receiving antenna. This arrangement allows the hearing aid to receive the same audio signal received by the loudspeaker within the handset.

One or more of the Inventors herein attempted to improve signal transfer between the HAC coil and the T-coil. This attempt led to an unexpected improvement in the handset, which allowed hearing-impaired persons to more readily understand speech delivered by the improved handset, without use of the T-coil or the associated hearing aid.

SUMMARY OF THE INVENTION

The following application Ser. No. 10/864,691, entitled "Improved Telephone Handset," in which the Inventors are Joan Phillips Waldron and Brett William Jelkin, is filed concurrently herewith.

BRIEF DESCRIPTION OF THE DRAWINGS

FIG. 1 illustrates a telephone handset as used in the prior art.
FIG. 2 illustrates one form of the invention.
FIG. 3 illustrates one type of magnetostrictive coil 39 which can be used in the apparatus of FIG. 2.
FIG. 4 is an electrical schematic of inductor 39 in FIG. 2 in series with the speaker 33 of FIG. 2.
FIG. 5 is a time-domain plot of the trapezoidal input 105, produced by the signal generator 115 in FIG. 4, and the resulting output 100, measured by spectrum analyzer 112 in FIG. 4.
FIGS. 6 and 6A illustrate the frequency spectrum of the output 100 of FIG. 5.
FIG. 9 is a schematic illustrating radiating noise N.
FIG. 10 illustrates a telephone headset.

DETAILED DESCRIPTION OF THE INVENTION

Figure 8:
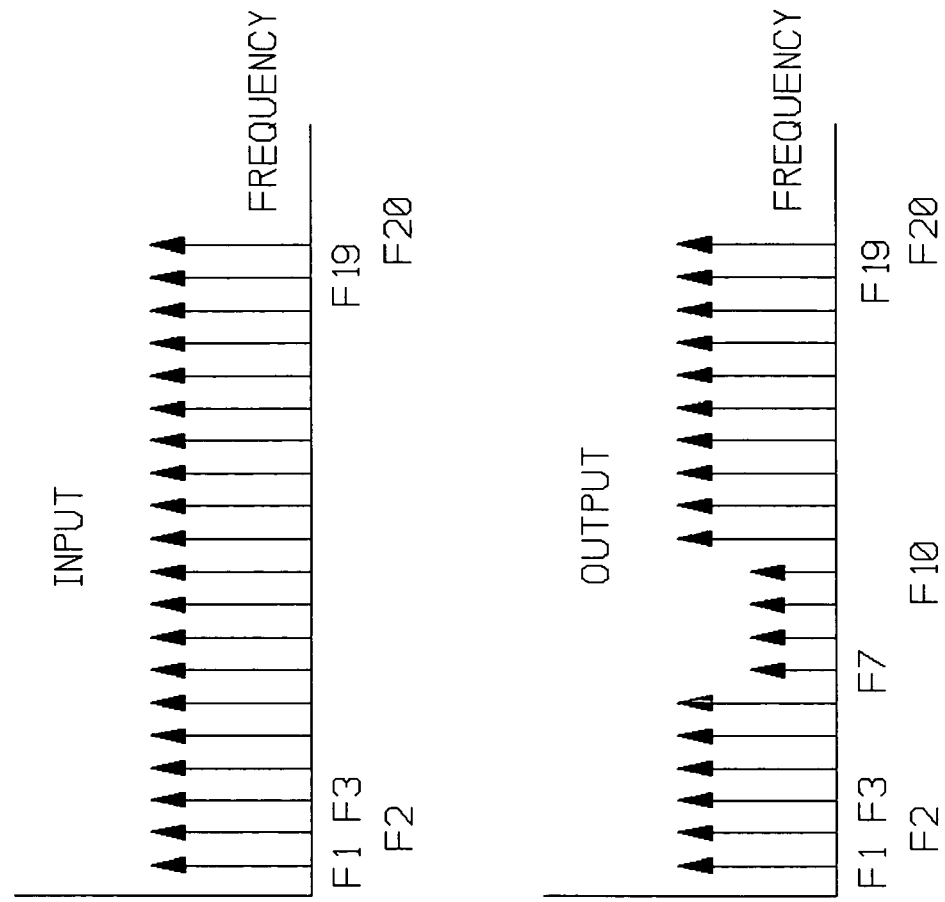
FIG. 8 illustrates frequency response of a notch filter, which the invention may be designed to implement.

FIG. 1 illustrates a telephone handset 3, which contains a loudspeaker 6 in the earpiece 9. Many such handsets are equipped with an HAC coil 18, which can be connected with the speaker 6. Such coil-equipped handsets are often termed type-HAC, or Hearing Aid Compatible. The HAC coil 18 produces a magnetic field 21, which couples with a similar coil 24, often termed a T-coil, or telephone coil, within a nearby hearing aid 27, when the latter is held near the handset 3.

The coupling transfers the electronic signal received by the speaker 6 to the hearing aid 27, thus allowing the hearing aid to receive the same electronic signal received by the speaker 6. The hearing aid 27 then delivers the signal to an earpiece 30, or other device, for use by a hearing-impaired person.

The hearing aid 27 may apply signal-processing techniques to the audio signal, to render the signal more intelligible to the hearing-impaired person. Perhaps the most common signal-processing technique is simple amplification of the signal, but other, more sophisticated, techniques are also used. These techniques include, without limitation, 1) filtering, wherein one or more frequency bands are diminished in amplitude, and thereby blocked from reaching the person at their original amplitude;
2) selective amplification, which can be viewed as a type of filtering, wherein selected frequency bands are amplified more than others;
3) phase shifting;
4) time delays; and
5) frequency shifting, wherein one or more frequency bands are shifted in frequency.

In addition, the signal processing techniques include dividing the input signal into two or more frequency bands, and applying one or more of these five techniques to the individual bands. Further, different techniques can be applied to different bands.

One or more of the Inventors herein embarked on a project to improve coupling between the HAC coil 18 and the T-coil 24 within the hearing aid 27, to amplify the signal received by the hearing aid 27. One goal of the amplification was to improve signal-to-noise ratio.

Attempts were made to increase the magnitude of the magnetic field 21 in FIG. 1. It was observed that the particular coil 18 found in one handset was of the air-core type. To increase the magnetic field 21, replacement of the air core with an iron-bearing core was examined.

One motivation lies in the fact that an electric current, such as that carried by the wires of the coil 18, produces a magnetic field vector, termed the H-vector. The arrow 21 in FIG. 1 represents such a vector. The H-vector is more precisely termed the magnetic field strength.

Another vector is associated with the H-vector, namely, the B-vector, termed the magnetic flux density. The B-vector is related to the H-vector by the expression $B=\mu H$, wherein $\mu$ is the permeability of the material in which the H-vector resides.

In an air-cored coil, the H-vector resides in air. The permeability, $\mu$ is relatively low. However, $\mu$ for iron is relatively high, and can be 10,000, 100,000 or even one million times larger than that of air.

Since it was found that the coil 18 contained an air core, replacing the air core by an iron-type core can increase the size of the B-field by a factor of 10,000 to one million. The reason is, again, the fact that the B-vector equals the H-vector multiplied by $\mu$. If $\mu$ is multiplied by, say, 100,000, in changing the core from air to iron, then the B-vector becomes also multiplied by 100,000.

To this end, an inductor containing an iron-bearing core was fabricated and used to replace the coil 18 in a telephone handset. However, during testing, a hearing-impaired person discovered a phenomenon unrelated to the improved coupling between the coil 18 and the hearing aid which was being pursued.

That person discovered that the audio signal emanating from the modified handset, when perceived by the unaided ear, was more intelligible than previously.

Further investigation led to the conclusion, or belief, that a significant feature of the iron-cored coil was not the presence of the iron, which was used to increase permeability. Rather, it was found that the iron core was magnetostrictive, and the improved intelligibility was attributed to the magnetostrictive characteristic.

A magnetostrictive material is one which changes significantly in dimension in the direction of an applied magnetic field.

Based on this discovery, one or more of the Inventors pursued investigations into different types of magnetostrictive materials. They eventually observed that the magnetostrictive material sold under the trade name METGLAS provided superior results, as perceived by the hearing impaired person. METGLAS is a trademark of Metglas, Inc., 440 Allied Drive, Conway, S.C., USA 29526.

Coils constructed using METGLAS were fabricated, and tested in a telephone handset. The testing uncovered three significant features. One feature is that, in one test, a person having a hearing impairment of a profound degree compared speech signals produced by the modified handset with similar speech signals produced by a similar, but unmodified handset, containing an ordinary T-coil. This person found that the modified handset provided improved intelligibility of the speech.

The type of testing used is described in the science of audiology as speech discrimination testing. The term "profound," as applied to hearing loss, is a term-of-art, and is defined below.

The second feature was observed in testing a person of normal hearing ability. It was found that the modified handset either (1) did not distort the speech produced by the handset, or (2) any distortion did not affect intelligibility of such speech, as perceived by this person.

The third feature was found in a test performed on brain functioning of a hearing-impaired person having a profound hearing loss. An ordinary handset, used without a hearing aid, produced no measured brain response in such person. This led to the inference that the hearing mechanisms of the ear in this person were deficient in delivering auditory signals to the brain.

In contrast, when using the modified handset containing the METGLAS cored coil, brain response was detected, leading to the inference that the modified handset overcame at least some of the deficiencies in the hearing mechanisms. Brain response was measured using the well-known auditory brainstem response (ABR) protocol of diagnostic techniques.

FIG. 2 illustrates one form of the invention. A telephone handset 30 contains a commercially available loudspeaker 33 and an inductor 39 having a highly magnetostrictive core. FIG. 3 illustrates one suitable inductor 39.

A toroidal core 42 is constructed of the commercially available material known as METGLAS. Surrounding the core 42 are multiple windings of common magnet wire, as used in ordinary inductors. The number of windings, or loops, lies preferably in the range of 150 to 250. The inductance, measured at audio frequencies, lies in the range of 0.5 to 8.0 milli-Henries. Resistance lies in the range of 1 to 5 ohms.

A simulation of behavior of the apparatus of FIG. 2 was run. FIG. 4 illustrates a model of the inductor-speaker system. Values of inductance and resistance for each component are given. FIG. 5 illustrates a computed time-domain plot 100 of the response, or output, of the invention to a trapezoidal input 105 of 1,000 Hz frequency, produced by the signal generator 115 in FIG. 4. The response was measured at point 115 in FIG. 4.

FIG. 6 is a frequency-domain representation, or Fourier spectrum, of both the trapezoidal input and the output, each being so-labeled, and showing only frequencies at 11 KHz and lower.

FIG. 6A illustrates the plot at an expanded scale on the vertical axis, to show frequency components which are too small to depict in FIG. 6. Further, the frequencies at 7.0 KHz and above are depicted at a still greater expanded scale, which is indicated at the right side of the plot.

FIGS. 6 and 6A clearly show that odd harmonics in the output are reduced, compared with the input. Since FIGS. 6 and 6A indicate that high frequencies are attenuated, these Figures indicate that the coil in FIG. 4 acts as a low-pass filter. Further, the low-pass filter is constructed of a single element, namely, the inductor wound about a magnetostrictive core.

In addition to the features outlined above, the invention provides benefits to users of hearing aids who are located in the vicinity of computer monitors or cell phones.

It is known that both computer monitors and cell phones generate electromagnetic interference (EMI) in hearing aids and other stray radiation. Other sources of stray radiation, such as fluorescent lights, motors in cars, and computer chips in cars, also produce interference in hearing aids.

This interference produces audible noise to the user, which interferes with the user's attempts to hear incoming sounds. It has been found that the invention reduces, or eliminates, this EMI, as well as other types of EMI.

FIG. 9 illustrates the handset of FIG. 2, adjacent a human ear E. A standard hearing aid HA is present in the ear. A source S of EMI is indicated, together with radiated electrical noise N. The Inventors have found that the arrangement of FIG. 9 reduces EMI in the hearing aid HA, at least as perceived by the user.

One possible explanation for the noise reduction is the following. In brief, this explanation contemplates two routes of entry for the noise N to the hearing aid HA. One route is through the head, or skull. Some possible mechanisms which may block this route are set forth immediately below. The second route is through the ear canal, and this route is possibly blocked by the invention, as explained later.

In FIG. 9, dashed line T represents the human tissues surrounding the ear A, and these tissues represent the human head generally. These tissues are composed largely of water. The water contains numerous electrolytes, and is thus electrically conductive. Being conductive, the water, in theory, will reflect electromagnetic radiation, since conductors, in general, are treated as reflectors of such radiation. Since the noise N takes the form of electromagnetic radiation, the electrolyte-bearing water, in theory, reflects the noise N. The reflected noise N does not reach the hearing aid HA.

However, the electrolyte-bearing water is probably not a perfect reflector. Some noise N is expected to enter the water.

The electrolytes in the water may dissipate the entering noise, and two models explaining the possible dissipation are the following.

It is known that electromagnetic radiation, such as the noise N, contains two field vectors: an electric field, and a magnetic field, arranged at 90 degrees to the electric field. These field vectors continually oscillate.

That is, each field vector increases in magnitude to a positive peak value, then decreases to zero. Then the field reverses in direction, and increases to a negative peak value. After reaching the negative peak, it decreases to zero, and then increases to the positive peak value, and the process repeats.

Water is a dipole: each water molecule contains a positively charged end, and a negatively charged end. Being dipoles, the water molecules tend to align with the electric field vector. Since that vector is continually changing in direction, the water molecule also continually attempts to change in direction, in attempting to remain aligned with the electric field vector.

That continual movement of the water molecules represents thermal energy, and the oscillating electric field vector may cause the movement to increase. The agitation of the water induced by the oscillating electric field causes a slight rise in temperature. The rise in temperature absorbs energy from the electric field vector in the noise N. In theory, the absorption reduces the magnitude of the electric field vector, thus reducing the noise N reaching the hearing aid HA.

A similar analysis can be made with respect to the oscillating magnetic field vector, which may generate eddy currents in the electrolyte-bearing water, also absorbing energy.

Thus, it may occur that the energy absorption modes just described serve to block part, or all, of the noise N from reaching the hearing aid HA, through the tissues of the skull.

The second route to the hearing aid is through the ear canal (not shown). However, when the handset is adjacent the ear E, the wires W, and also the coils of wires (not labeled) in the speaker 33, the coil 200, and the magnetostrictive inductor 39, may act as receiving antennas, and pick up the noise N.

The magnetostrictive coil 39, as explained above, which is connected to those wires, may dissipate energy in the noise N, because of the resistive properties of the magnetostrictive material.

It is emphasized that the preceding is presented as a possible explanation for an observed phenomenon. The observed phenomenon is that the handset 30, when positioned adjacent the ear of a person wearing a hearing aid, suppresses interference otherwise picked up by the hearing aid HA, when near a computer monitor or a cell phone. The preceding discussion is presented as a plausibility argument.

Two points on FIG. 9 will be addressed. It seems unlikely that noise-energy will be dissipated in the magnetostrictive coil 39, if that coil 39 faces an open circuit. One reason is that no current flows through the coil in such a situation. Thus, it may be necessary that the coil 39 face a completed circuit, represented by resistor R, in order for the noise suppression described above to occur.

The second point is that the coil 200 is not necessarily required. It may be omitted in some applications.

The Inventors have discovered another application for the noise-suppression features just described. It has been found that, when the handset 30 of FIG. 9 is fashioned into a headset, which includes the magnetostrictive coil 39, this headset can benefit persons having normal hearing.

Specifically, as shown in FIG. 10, a telephone headset 300 incorporating the magnetostrictive coil 39 as described above is used with a cell phone 305, in so-called hands-free mode. Persons having normal hearing have reported that this modified headset 300 improves sound quality.

Thus, the headset 300 provides the three modes of operation described above, namely, (1) T-coil support for a hearing aid, (2) use by a person wearing a hearing aid in microphone mode, and (3) use of the headset 300 alone, by a hearing-impaired person who is not presently using a hearing aid. In addition, the headset 300 provides improved sound quality to a person of normal hearing ability.

Additional Considerations

1. It was found that a single, electrically passive device, namely, the inductor 39 containing a magnetostrictive core, when added to a telephone handset, improved intelligibility of speech to a hearing-impaired person. It is believed that the magnetostrictive inductor 39 performs one, or more, of the signal-processing functions ordinarily performed by hearing aids. These functions include
   1) filtering;
   2) selective amplification;
   3) phase shifting;
   4) time delays; and
   5) frequency shifting.

Figure 7:
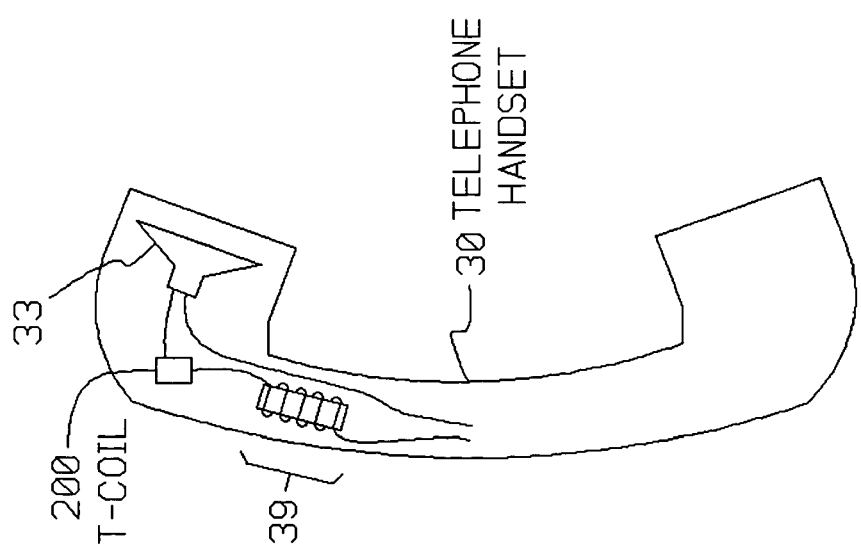
FIG. 7 illustrates one form of the invention.

2. In one form of the invention, the inductor containing a magnetostrictive core is used in addition to an HAG coil present in the handset and used to couple with a T-coil. FIG. 7 illustrates one embodiment, wherein a telephone handset 30 contains a prior-art speaker 33, a prior-art HAG coil 200, and the magnetostrictive inductor 39 as described herein. Such a handset allows a person desiring assistance of a hearing aid to utilize the coil 200, and other persons to use the handset alone.

3. One approach to designing a handset which implements the invention is the following.

First, the desired operating characteristics of the telephone handset are obtained. For example, the desired operating characteristics can be determined through testing of a hearing-impaired person, to determine that person's needs. As a specific example, it may be determined that a specific person has diminished hearing in a specific frequency range. The desired output characteristic for that person may call for boosted amplitude in that frequency range, to compensate for the diminution.

The desired output characteristics can be specified by the transfer function of the handset, which is sometimes termed the frequency response. The latter term refers generally to a type of output spectrum, such as the output spectrum in FIG. 8, which is produced in response to an input spectrum.

In the example of FIG. 8, it is seen that the input spectrum is uniformly distributed across all frequencies from F1 to F20. However, the output spectrum diminishes frequencies in the range of F7 to F10. In this particular example, a notch filter is the desired operating characteristic, with the notch lying between F7 and F10. Of course, this characteristic is exemplary, and the particular output spectrum desired will depend on the application in question.

Once the desired output characteristics are ascertained, different coils of the type shown in FIG. 3 are tested, each coil having different (1) numbers of windings, (2) core diameters, and (3) core materials, for example. The test is done, for example, by substituting each coil for the existing HAC coil in a telephone handset. In the testing, each coil is assigned a figure-of-merit, or metric, indicating how well the coil-handset combination approaches the desired operating characteristics. Then, the coil having the best metric is chosen.

4. The Inventors emphasize that, speaking generally, when a given operating characteristic of a handset is specified, the particular magnetostrictive inductor needed is not thereby automatically specified. One reason is that it appears that the magnetostrictive inductor interacts electrically with the speaker of the handset, and other components.

Thus, the electrical properties of the speaker, and other components, influence the operating characteristics. Since different speakers in different handsets have different electrical characteristics, the coil used must be matched to the particular handset in question.

5. The Inventors point out that the acoustic signal delivered to the user of the handset is not necessarily produced exclusively by the speaker of the handset, but may be also produced by the magnetostrictive inductor. That is, the magnetostrictive inductor coil may act as an auxiliary speaker.

In addition, since the magnetostrictive inductor will, in general, be fastened to the housing of the handset, vibration of the coil may be transferred to the housing. The housing may, in effect, act as a speaker cone, and couple this vibration to the air, or to a human ear in contact with the housing.

6. Additional Consideration 3 assumed that a pre-defined output characteristic was generated during the design process of the handset. In another approach, no pre-defined output characteristic is used. Rather, a cut-and-try approach is taken, for each different person. Different coils are inserted into a handset, and a hearing-impaired person examines each handset, by listening to it. The person selects the handset producing the best output.

7. In one embodiment, the core of the inductor was constructed of Metglas alloy having a magnetostriction factor exceeding 10 ppm, parts per million.

8. It is recognized that many iron-containing compounds and alloys may be magnetostrictive. It is also recognized that filters are utilized in telephone systems, which filters are constructed of resistors, capacitors, and inductors. It is further recognized that some of these inductors, in having ferrite cores, could be, in theory, classified as magnetostrictive.

Thus, it could be said that prior-art telephone systems contain magnetostrictive inductors in the signal path leading to the speakers in the handsets of the telephones in those systems.

However, such magnetostriction is de minimus in nature, and is not seen as providing the improvements in intelligibility for hearing-impaired persons, as discussed herein.

Further, magnetostriction is a source of loss. For example, it is well known that magnetostriction in electrical transformers (which contain inductors) generate heat, which is a type of loss. Designers of the filters described in the preceding paragraph seek inductors and capacitors having minimal losses.

Further still, it is quite likely that the magnetostriction of the inductors used in the invention introduces resistive properties to the inductor. That is, the magnetostrictive inductor behaves, to a first approximation, like a perfect inductor in series with a perfect resistor. The resistor represents, in part, the loss due to magnetostriction. For analysis and design purposes a magnetostrictive inductor is represented as an inductor paired with a resistor.

Such a circuit element would not be preferred by a designer of the telephone filters in question. One reason is that the overall inductor no longer behaves like a pure inductor, and is more difficult to model. For example, a pure inductor is expressed mathematically in filter design as $jwL$, wherein $j$ is the imaginary operator; $w$ is angular frequency of the signal applied, in radians per second; and $L$ is the inductance, in Henries.

Addition of the resistor causes the magnetostrictive inductor to be expressed as $R+jwL$, wherein $R$ is the resistance in ohms. This is now a two-element complex quantity, in the sense of complex-variable algebra, which increases complexity of the algebraic computations.

Still further, as just stated, the algebraic computations have been made more complex, yet no benefit from a filtering perspective is seen from the addition of the R-term.

Therefore, the Inventors submit that, despite the fact that filtering inductors have been present in the signal paths of telephones in the prior art, the following conclusions seem clear. One, those inductors do not provide assistance to hearing-impaired persons as does the present invention. Two, those inductors, in many cases, are used as parts of audio-frequency filters. Adding magnetostriction would add loss, and also a resistive term. The latter makes computation, and thus design of the filter, more complex. Three, the added complexity caused by the magnetostriction is not offset by any benefit conferred by the magnetostriction.

9. Two types of frequency shifting should be distinguished. In one type, an input frequency component f1 is shifted to a new frequency in the output, such as f11. But input frequency component f1 is not found in the output; it his replaced by f11.

In the other type, frequency component f1, or part of it, is also found in the output, in addition to frequency f11.

The invention contemplates both types of frequency shifting. In addition, it should be observed that, if one compares the output spectrum with the input spectrum of a frequency-shifted signal, one finds signal components present in the output spectrum which are not present in the input spectrum, namely, the shifted components. It could be said that new frequency components are added, and appear in the output.

10. The magnetostrictive inductor is a passive device. One definition of passive is that output power does not exceed input power. In contrast, in an active device, such as a transistor amplifier, output power can exceed input power.

11. Magnetostrictive materials are found in magnetostrictive transducers used in sonar work.

12. The preceding discussion was framed in terms of a telephone handset. The invention is also applicable to any system which transmits sound to a listener, including headsets; headphones; earpieces connected to communication devices such as telephones and consumer audio equipment; portable hand-held telephones and cell phones; hands-free telephones and other headsets; and telephones in which substantially all working components are contained within a single housing, which may resemble a handset.

Also, the source of the audio signal reaching the headset is not necessarily considered significant. The signal can be transmitted in a wireless manner. It can originate in digital format, as when originating from a music CD or from a telephone signal taken from the Internet, as in VOIP, Voice Over Internet Protocol.

In one form of the invention, the invention is found in a personalized speaker, used by a single individual, as in a headset, and is not found in a loudspeaker which produces sound heard by several individuals.

13. It is recognized that the coil 39 in FIG. 3 can be constructed of different materials, of different shapes and sizes, with different numbers of windings. For example, inductance of the coil may be found to be a major contributor to the intelligibility enhancement described herein.

It is known that increasing the number of windings will increase inductance, and that decreasing the number of windings will decrease the inductance. It is also known that increasing the permeability of the core material will increase inductance, and that decreasing permeability will decrease the inductance.

Therefore, considering only (1) number of windings and (2) permeability of core material, a given level of inductance can be obtained in numerous ways.

14. In one embodiment, the core of the magnetostrictive coil 39 in FIG. 3 is constructed of high-saturation material. High saturation is defined as having a saturation level exceeding 5,000 gauss. Many Metglas alloys have a saturation level of 20,000 gauss, or higher.

15. The term "profound hearing loss" was used in the discussion above. This is a term-of-art, and is one of five terms of art used to describe hearing ability in humans. Those five terms, and the associated hearing loss, are the following:

- normal—0 to 25 dB;
- mild—26 to 45 dB;
- moderate—46 to 70 dB;
- severe—71 to 90 dB; and
- profound—91 dB and over.

The abbreviation dB refers to decibel, and the decibel ranges refer to the quietest sound, measured in decibels, which a person can hear. For example, a person with normal hearing can hear quiet sounds ranging between zero and 25 dB. Of course, this is a population average: not every normal person can hear sounds in the lower end of that range.

Thus, the person suffering profound loss, discussed above, can hear no sounds quieter than 91 dB. As a frame of reference, ordinary conversation is measured at about 50 dB.

16. The invention has been found to provide assistance to persons having moderate, severe, and profound hearing loss, as those terms are defined in the science of audiology, and outlined in the preceding section.

The invention should be distinguished from another apparatus which provides assistance to hearing-impaired persons in the use of the telephone. That apparatus is the familiar adjustable volume control. However, such controls only provide assistance to persons having mild to moderate hearing loss, as those terms are defined in point 15, above.

17. The Inventors point out that the invention offers three modes of operation. Assume a hearing-impaired person utilizes a standard hearing aid, which has a switch allowing selection of (1) T-coil operation, (2) microphone (ie, normal) operation, wherein a microphone in the hearing aid picks up incoming sounds and amplifies them, and (3) possibly other settings.

Assume also that a telephone handset, or other device, is equipped with (1) the magnetostrictive coil 39 in FIG. 3, (2) a standard T-coil, and (3) the standard speaker of the earpiece.

In a first mode of operation, the person sets the switch in the hearing aid to the microphone-setting, and utilizes the handset as a person would who lacks hearing impairment. The hearing aid receives sound from the speaker in the handset and amplifies it for the person. In the first mode, the invention eliminates much annoying acoustic feedback often perceived by a person wearing a hearing aid. Such feedback is often perceived as a whistling sound.

It may be thought that the person can avoid the feedback by using a T-coil with the telephone handset, as described herein, and thereby eliminating acoustic coupling between the speaker in the handset and the microphone in the hearing aid. That coupling is a primary cause of the feedback.

However, T-coils are not found in all hearing aids. About two percent of hearing aids are of the in-canal type, which are very small. In today's technology, T-coils of sufficiently small size to fit into an in-canal hearing aid have not been developed, or at least are not widely available at a reasonable price. Thus, persons using in-canal hearing aids remain exposed to the feedback. As stated, the invention reduces or eliminates this feedback in the first mode.

In the second mode of operation, the person sets the switch to the T-coil-setting, and places the handset adjacent the hearing aid. The person hears the telephone through the hearing aid. IN the second mode, acoustic feedback is also suppressed.

In the third mode of operation, the person eliminates the hearing aid, and uses the handset exclusively. As explained above, the handset illustrated in FIG. 2, by itself, has been used successfully by persons having hearing loss exceeding that known as moderate.

18. The magnetostrictive core within the inductor introduces loss into an AC signal applied to the inductor, and thus can be termed "lossy."

19. It was stated above that the invention, in a telephone handset or a headset, reduced electromagnetic interference from sources such as computer monitors and cell phones. Interference from other types of stray radiation was also reduced, such as radiation from fluorescent lights and radiation from arcing in electric motors.

Because electromagnetic radiation of all types has a common property, namely, electromagnetic radiation at multiple frequencies, it is believed that the invention will be successful in suppressing all types of if EMI, regardless of source.

This includes EMI in which the frequency components are randomly distributed. This also includes EMI in which frequency components are uniformly distributed. This latter type is sometimes called "white" noise, by analogy to white light, which contains all colors, which are actually frequencies.

20. One type of toroidal magnetostrictive core which has been tested is that designated by the Honeywell/Allied part number 0803 MDGC, which refers to a bare toroidal core constructed of Metglas material, lacking any windings. Another core which has been tested is that sold by Amotech, as part number C0715(M).

21. One type of test indicated that the invention produces a type of frequency shifting. For example, an incoming frequency of 2 kilo-hertz was shifted, completely or partially, to 4 kilo-hertz.

This shift may partly explain the success of the invention in providing a telephone which improves hearing for deaf persons. One explanation is the following.

It is well known that ordinary human hearing occupies a spectrum from about 50 Hz to about 15 KHz or 20 KHz. However, in today's technology, ordinary telephones have a bandwidth of about 2,500 or 3,000 Hz. Thus, a telephone only passes the lower 2,500 or 3,000 Hz of the range of human hearing. Frequencies above this range are blocked.

Thus, for example, if a hypothetical person cannot hear frequencies below 5,000 Hz, then, in theory, that person cannot use a telephone.

The invention, in performing the frequency shifting just described, can be viewed as restoring part of the bandwidth suppressed by the telephone system. That is, without the invention, the user of a telephone will hear a bandwidth having a ceiling at 2,500 or 3,000 Hz. But with the invention, a component at 4 KHz is added.

Thus, the invention may be viewed as expanding the bandwidth of a telephone, or adding frequencies outside the bandwidth of the telephone. The invention may be viewed as (1) synthesizing one or more information-containing frequency components, which lie outside the bandwidth of a telephone, and (2) adding the synthesized components to the acoustic signal delivered to the user of the telephone. This can be viewed as reducing the effects of backward masking.

22. The invention is applicable to hearing aids, or assistive devices, whether external or internal, and to hearing instruments generally.

Figure 11:
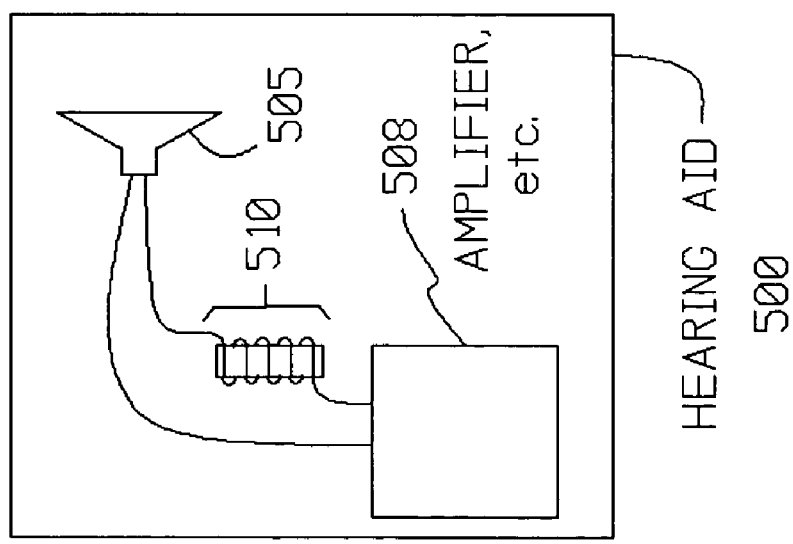
FIG. 11 illustrates schematically a generic hearing instrument 500, such as a hearing aid.

FIG. 11 illustrates schematically a generic hearing instrument 500, such as a hearing aid. The hearing instrument 500 contains a speaker 505. Block 508 represents a microphone, and amplification and processing circuitry. Connected with the speaker 505 is an inductor 510, of the type described herein, having a magnetostrictive core.

It was stated above that in-canal type hearing aids are generally not equipped with T-coils, because of the small size of in-canal hearing aids. However, it has been discovered that the magnetostrictive toroidal core available from Amotech, and described in point number 20 above, may be small enough to fit into an in-canal hearing aid.

Thus, the hearing aid 500 of FIG. 11 can also be taken to represent an in-canal hearing aid, with the inductor 510 being of appropriately small size.

Figure 12:
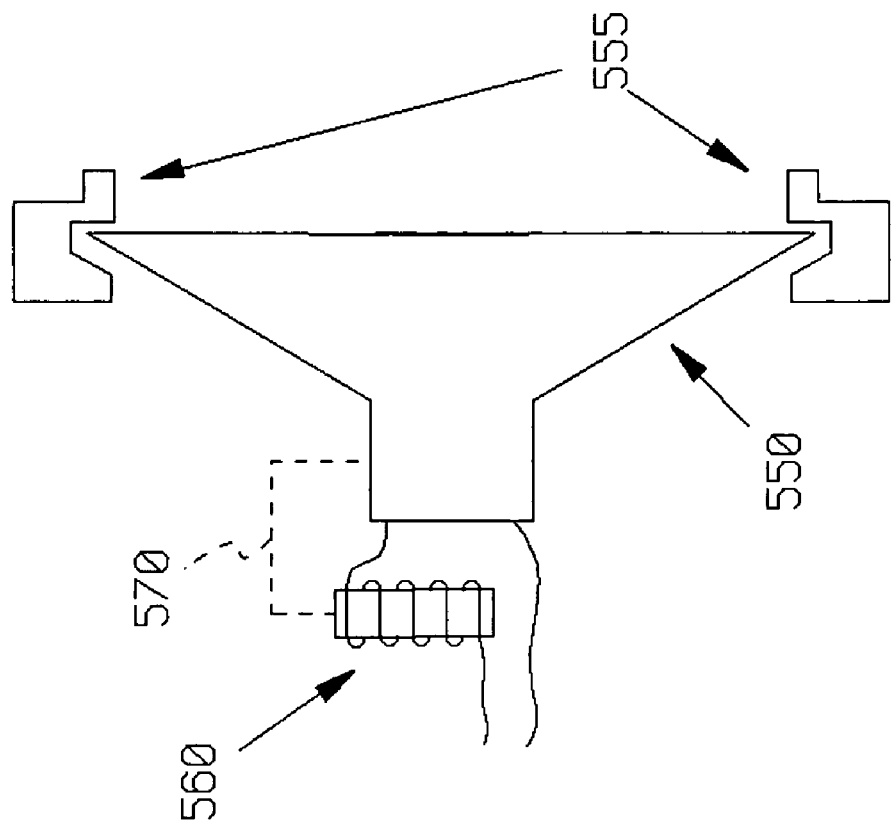
FIG. 12 illustrates one form of the invention.

23. FIG. 12 illustrates one form of the invention. A speaker 550, of the type used in telephone handsets, is shown, and is commonly termed a capsule or speaker capsule. The speaker 550 contains mounting elements 555, indicated schematically, such as appropriate bosses, recesses, bolt holes, mounting points, snap fittings, or any combination of the preceding. The mounting elements 555 will, in general, be designed to correspond to the particular telephone handset (not shown) into which the speaker 550 is to be mounted.

The invention attaches a magnetostrictive inductor 560 to the speaker 550. The attachment is indicated by dashed line 570.

The integrated speaker-550/inductor-560 is sold as a single product, or capsule, for insertion into telephone handsets by persons, such as hearing-impaired persons, who wish to modify existing handsets, and use the modified handsets. Also, the integrated speaker-550/inductor-560 can also be used by manufacturers of handsets, in their assembly process.

It is possible that a bracket, not shown, can act as intermediary between the telephone handset and the speaker/inductor combination. That is, the bracket is designed to mount into a handset. It is also designed to receive and support the speaker and inductor.

24. The discussion above focused on magnetostrictive inductors connected in series with a speaker. However, a series connection is not necessarily required in order for the magnetostrictive inductor to influence the signal reaching the speaker. For example, a parallel connection may be suitable.

In addition, the magnetostrictive inductor described above can be viewed as a single, discrete element of an electrical filter. A more complex filter can be envisioned, in which one or more magnetostrictive inductors are used, in a network configuration, with other elements possibly added. The other elements can include resistors, capacitors, inductors, and active elements, such as operational amplifiers.

25. The invention is applicable to the following types of hearing aids, and others: behind-the-ear (BTE), in-the-ear (ITE), in-the-canal (ITC), completely-in-the-canal (CIC), and bone-anchored devices.

The invention is also applicable to the following types of devices, and others: middle ear implanted receivers, brainstem auditory implants, cochlear implants, and assistive devices such as hard-wired, FM, infrared, and loop systems.

Numerous substitutions and modifications can be undertaken without departing from the true spirit and scope of the invention. What is desired to be secured by Letters Patent is the invention as defined in the following claims.

The invention claimed is:

1. A method for improving a perceived sound signal in a telephone, comprising:
   a) operating a telephone having a bandwidth BW; and
   b) using an apparatus within the telephone, to shift frequency of sounds produced by the telephone outside the bandwidth BW wherein the apparatus includes an inductor having a wire wound magnetostrictive core of such a configuration as to thereby increase the intelligibility of a the sound signal through the telephone to a person having a predetermined type of hearing impairment.

2. Method according to claim 1, wherein the apparatus comprises a toroidal inductor having a magnetostrictive core having a magnetostriction factor exceeding 10 parts per million.

3. A method for modifying perceived sound intelligibility, comprising:
   a) operating a telephone having a bandwidth BW; and
   b) within the telephone,
      i) synthesizing one or more information-containing frequency components, which lie outside the bandwidth BW using a magnetostrictive inductor element; and
      ii) adding the synthesized components to an acoustic signal delivered to the user of the telephone to thereby increase the intelligibility of a speech signal through the telephone to a person having a predetermined type of hearing impairment.

4. A telephone handset for increasing the intelligibility of a speech signal through said handset to a person having a predetermined type of hearing impairment and comprising:
   a) a handset housing;
   b) a speaker positioned within said housing;
   c) a hearing aid compatible (HAC) coil positioned within said housing and connected to said speaker;
   d) an inductor positioned within said housing and connected to said speaker and said HAC coil, said inductor being formed by wire wound on a magnetostrictive core;
   e) said core being toroidal;
   f) said core having a magnetostriction factor exceeding 10 parts per million; and
   g) said inductor being of such a configuration and cooperating with said speaker and said HAC coil in such a manner as to increase the intelligibility of said speech signal through said handset to a person having said predetermined type of hearing impairment.

* * * * *

UNITED STATES PATENT AND TRADEMARK OFFICE
CERTIFICATE OF CORRECTION

PATENT NO.        : 7,657,049 B2                                          Page 1 of 1
APPLICATION NO.  : 10/864692
DATED             : February 2, 2010
INVENTOR(S)       : Waldron et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Thirtieth Day of November, 2010

David J. Kappos
*Director of the United States Patent and Trademark Office*